March 10, 1970   F. M. NELSON ET AL   3,499,783
POLYURETHANE COATINGS DERIVED FROM AROMATIC
AND ALIPHATIC POLYISOCYANATES
Filed May 17, 1967
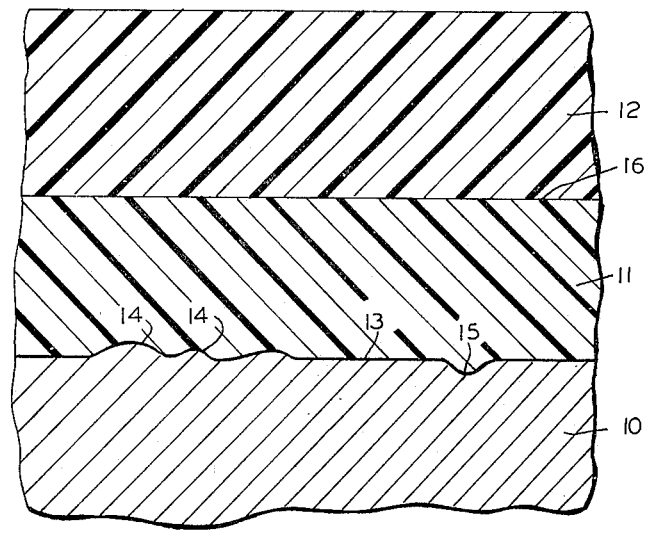
INVENTORS
FLOYD M. NELSON
GRANT O. SEDGWICK
BY
Plumley, Tyner & Sandt
ATTORNEYS

United States Patent Office 3,499,783
Patented Mar. 10, 1970

3,499,783
POLYURETHANE COATINGS DERIVED FROM AROMATIC AND ALIPHATIC POLYISOCYANATES
Floyd M. Nelson, St. Paul, and Grant O. Sedgwick, Minneapolis, Minn., assignors to Ashland Oil & Refining Company, Ashland, Ky., a corporation of Kentucky
Filed May 17, 1967, Ser. No. 639,219
Int. Cl. B44d 1/14
U.S. Cl. 117—72    11 Claims

ABSTRACT OF THE DISCLOSURE

This specification discloses coatings of polyurethanes, and in particular a substrate having a first coating of a polyurethane which is color-degradable under the influence of ultraviolet light, and a second coating of a polyurethane containing an ultraviolet light absorbent material. Processes for coating substrates with these two polyurethane coatings are also described. The coatings of the present invention are useful as paint substitutes and find particular utility as coatings for floors.

---

Since their discovery some years ago, polyurethane coatings have enjoyed wide consumer acceptance and have been widely used as protective coatings for all types of substrates. This has been due, at least in part, to the ease of application of the uncured coating material and together with the very desirable mechanical and chemical properties of the cured coating. However, polyurethane coatings, and especially those derived from aromatic isocyanates, have the undesirable property of being color-degradable under the influence of ultraviolet light. This property has, in general, limited their use to applications in which the coatings were either not exposed to ultraviolet light or in which the darkening of the coating was not deemed undesirable. Therefore, in recent years, considerable effort has been expended in an attempt to develop polyurethane coatings having increased resistance to the adverse effects of ultraviolet light. See, for example, U.S. Patent 3,047,520 and U.S. Patent 3,203,931. Many of these attempts to impart ultraviolet light resistance have resulted in the impairment of other properties which are desirable in a coating. These properties include, among others, flexibility, hardness, wear resistance, impact resistance, solvent resistance, clarity, color, chemical resistance, fungus and mildew resistance, and resistance to acids and bases.

It is, therefore, an object of the present invention to provide a novel polyurethane coating having increased resistance to the deleterious effects of ultraviolet light.

Another object of the present invention is to provide a novel process for the production of polyurethane coatings having increased resistance to ultraviolet light.

Still another object of the present invention is to provide a method for imparting increased resistance to ultraviolet light to polyurethane coating compositions.

Still another object of the present invention is to provide a novel coating, and process for applying such, which cures rapidly under the influence of atmospheric moisture and which is resistant to the deleterious effects of ultraviolet light.

Yet another object of the present invention is to provide a novel process for coating substrates having irregularities with a polyurethane coating having increased resistance to ultraviolet light.

Additional objects and advantages of the present invention will be apparent by reference to the following detailed description and the single figure of the drawing, depicting a coated substrate according to the present invention.

Referring now to the drawing, there is shown a substrate 10 having thereon a first coating 11 and a second coating 12. The substrate 10 has an upper surface 13 which can have a variety of irregularities such as humps 14 extending above the surface and fissures, cracks, or indentations 15 extending below the surface. Examples of substrate 10 which can be coated according to the present invention include, among others, those of wood, metal, plaster, linoleum, stone, and concrete. When the substrate 10 is a floor of wooden planks, the indentations 15 represent a crack between adjacent planks. When the substrate 10 is concrete, the humps 14 can be caused by pebbles and the indentations 15 can be caused by a ruptured bubble. The first coating 11 is a polyurethane derived from an aromatic polyisocyanate, and is preferably of such a thickness that it has a smooth or flat substantially planar surface 16 notwithstanding the humps 14 and the indentations 15. The second coating 12 adheres to the upper surface 16 of the first coating 11. The second coating 12 comprises a polyurethane derived from an aliphatic polyisocyanate and from 0.01 to 20 weight percent, and preferably 1.5 to 6 weight percent of an ultraviolet light absorbent material, the weight percentage being based on the weight of the dry-cured second coating 12.

Polyurethanes in general and especially those useful in the present invention are the reaction product of a polyisocyanate and an active hydrogen containing material. The polyisocyanate can be monomeric or polymeric, and can be described as aromatic or aliphatic. The term "aromatic polyisocyanate" as used herein refers to aromatic organic compounds having a plurality of NCO groups, one or more of which is attached to the aromatic ring. All other polyisocyanates are described as aliphatic. The active hydrogen containing material can be monomeric or polymeric. The presence or absence of active hydrogen atoms is determined by the Zerewitinoff test which is described by Kohler in volume 49 of the Journal of the American Chemical Society, page 3181 (1927). According to this test, active hydrogen atoms are generally found in monomeric and polymeric materials having one or more of the following groups, OH, COOH, $NH_2$, and NRH where R is any organic radical.

The polyisocyanate and the active hydrogen containing material can be combined by a variety of processes depending upon the intended end use of the polyurethane. Where the intended end use is a coating, the polyurethanes useful in the present invention can be employed in the form of either "two component systems" or "one component systems." In the so-called two component systems, the polyisocyanate is mixed with cross-linking amounts of an active hydrogen containing material. When employing this type of coating system, the consumer mixes the polyisocyanate and the active hydrogen containing material shortly before use. Immediately upon mixing, the cross-linking reaction begins with a consequent continued increase in viscosity. Because of the constantly increasing viscosity, the mixture must be applied to the substrate before the viscosity increases to such an extent that application of the mixture becomes difficult or impossible. In the so-called one component systems, a polyisocyanate prepolymer is produced as described more completely below, and this prepolymer is then applied to the substrate to be coated. The active hydrogen containing material which cross-links the prepolymer is the water present in air as atmospheric moisture. While the present invention is broadly applicable to both types of coating systems, optimum results are obtained when the polyurethanes are applied in the form of moisture curable prepolymers.

These moisture curable prepolymers are produced by reacting a monomeric polyisocyanate which can be aromatic if intended for the first coating or aliphatic if intended for the second coating, and a polymeric polyol having an average of two or more hydroxyl groups per polymer molecule. The term "polymeric polyol," as employed herein, is inclusive of polyether polyols, polyester polyols, and mixtures thereof. The term "polyether polyol" is meant to define polyethers and polythioethers which contain at least one polymeric ether chain. The term "polyester polyol" is meant to define hydroxyl group containing polyesters having more than one ester linkage.

The polyether polyols employed in forming the polyurethanes useful in the present invention generally have mean molecular weights of about 300 to 10,000. Useful polyether polyols include polyalkylene ether thioether glycols, polyalkylene arylene ether thioether glycols and polyalkylene ether triols. Polyalkylene ether glycols are preferred. Mixtures of these polyols can also be used.

The polyalkylene ether glycols can be represented by the formula $HO(RO)_nH$ wherein R is an alkylene radical which need not necessarily be the same in each instance and $n$ is an integer. Representative glycols include polyethylene ether glycol, polypropylene ether glycol, polytrimethylene ether glycol, polytetramethylene ether glycol, polypentamethylene ether glycol, polydecamethylene ether glycol, polytetramethylene formal glycol and poly-1,2-dimethylethylene ether glycol. Mixtures of two or more polyalkylene ether glycols can be employed if desired. The use of polyalkylene ether glycols in the formation of polyurethane polymers is described in U.S. Patent 2,929,800.

Representative polyalkylene ether triols are made by reacting one or more alkylene oxides with one or more low molecular weight aliphatic triols. The alkylene oxides most commonly used have molecular weights between about 44 and 250. Examples include: ethylene oxide; propylene oxide; 1,2-epoxybutane; 1,2-epoxyhexane; 1,2-epoxyhexadecane; 2,3 - epoxybutane; 3,4 - epoxyhexane, 1,2 - epoxy-5-hexene; and 1,2-epoxy-3-butene. Ethylene and propylene oxide are preferred. In addition to mixtures of these oxides, minor proportions of alkylene oxides having cyclic substituents can be present such as styrene oxide, cyclohexene oxide, 1,2 - epoxy-2-cyclohexylpropane, and 2-methyl styrene oxide. The aliphatic triols most commonly used have molecular weights between about 92 and 250. Examples include: glycerol; 1,2,6-hexanetriol; 1,1,1 - trimethylolpropane; 1,1,1 - trimethylolethane; 2,4-dimethyl - 2 - methylolpentanediol-1,5; and the trimethyl ether of sorbitol. Representative examples of the polyalkylene ether triols include: polypropylene ether triol (M.W. 700) made by reacting 608 parts of 1,2-propylene oxide with 92 parts of glycerine; polypropylene ether triol (M.W. 1535) made by reacting 1401 parts of 1,2-propylene oxide with 134 parts of trimethylolpropane; polypropylene ether triol (M.W. 2500) made by reacting 2366 parts of 1,2-propylene oxide with 134 parts of 1,2,6-hexanetriol; and polypropylene ether triol (M.W. 6000) made by reacting 5866 parts of 1,2-propylene oxide with 134 parts of 1,2,6-hexanetriol. Further examples of these polyalkylene ether triols are given in U.S. Patent 2,866,774.

The polyalklene arylene ether glycols are similar to the polyalkylene ether glycols except that some arylene radicals are present. Representative arylene radicals include phenylene, naphthalene and anthracene radicals which may be substituted with various substituents such as alkyl groups. In general, in these glycols there should be at least one alkylene ether radicals having a molecular weight of about 500 for each arylene radical which is present. Polyurethane polymers prepared from these polyalkylene arylene ether glycols are described in U.S. Patent 2,843,568.

The polyalkylene ether thioether glycols and the polyalkylene arylene ether glycols are similar to the above-described polyether glycols except that some of the ether oxygen atoms are replaced by sulfur atoms. These glycols may be conveniently prepared by condensing together various glycols, such as thiodiglycol in the presence of a catalyst, such as p-toluene sulfonic acid. The use of these glycols in the formation of polyurethane polymers is described in U.S. Patent 2,900,368.

The polyester polyols suitable in forming the polyurethanes useful in the present invention are those having acid numbers of 20 to 200 and include such polyester polyols as are obtained by the polymerization of cyclic lactones but are preferably those obtained by the condensation polymerization of dicarboxylic acids with a molar excess of diols. Optionally small amounts up to about 10 weight percent of higher functional polyols can be included. Suitable diols include: ethylene glycol; propylene glycol; trimethylene glycol; 1,2-butylene glycol; 1,3-butanediol; 1,4-butanediol; 1,5-pentanediol; 1,2-hexylene glycol; 1,10-decanediol; 1,2-cyclohexanediol; 2 - butene-1,4-diol; 3 - cyclohexane - 1,1 - dimethanol; and 2-methyl-1,3-propane diol and mixtures of two or more of these diols. Representative examples of useful dicarboxylic acids are: oxalic acid; malonic acid; succinic acid; glutaric acid; adipic acid; pimelic acid; suberic acid; azelaic acid; sebacic acid; fumaric acid; maleic acid; phthalic acid; isophthalic acid; and terephthalic acid. Extant anhydrides of dicarboxylic acids can be employed in place of the acids such as succinic anhydride and phthalic anhydride. If desired, mixtures of two or more of these dicarboxylic acids and/or anhydrides can be employed. Representative monomeric aromatic polyisocyanates useful in forming the polyurethanes of the first coating of the present invention include among others: toluene - 2,4 - diisocyanate; 3 - phenyl - 2 - ethylenediisocyanate; 1,5 - naphthalenediisocyanate; cumene - 2,4 - diisocyanate; 4 - methoxy-1,3-phenylenediisocyanate; 4 - chloro - 1,3 - phenylenediisocyanate; 4 - bromo - 1,3 - phenylenediisocyanate; 4-ethoxy - 1,3 - phenylenediisocyanate; 2,4' - diisocyanatodiphenyl ether; 5,6 - dimethyl - 1,3 - phenylenediisocyanate; 2,4-dimethyl - 1,3 - phenylenediisocyanate; 4,4'-diisocyanatediphenyl ether; bemzidinediisocyanate; 4,6 - dimethyl - 1,3 - phenylenediisocyanate; 9,10 - anthracenediisocyanate; 4,4' - diisocyanatodibenzyl; 3,3'-dimethyl-4,4' - diisocyanatodiphenylmethane; 2,6 - dimethyl-4,4'-diisocyanatodiphenyl; 2,4 - diisocyanatostilbene; 3,3'-dimethyl-4,4'-diisocyanatodiphenyl; 3,3'-dimethoxy-4,4'-diisocyanatodiphenyl; 1,4 - anthracenediisocyanate; 2,5-fluoroenediisocyanate; 1,8 - naphthalenediisocyanate; 1,3-phenylenediisocyanate; methylene - bis(4 - phenylisocyanate); 2,6 - diisocyanatobenzlfuran; 2,4,6 - toluenetriisocyanate; and 2,4,4' - triosocyanatodiphenyl ether. Representative monomeric aliphatic polyisocyanates useful in forming the polyurethanes of the second coating of the present invention include among others: 1,4 - tetramethylenediisocyanate; 1,6 - hexamethylenediisocyanate; 1,10- decamethylenediisocyanate; and 1,3-cyclohexylenediisocyanate, and 4,4'-methylene-bis(cyclohexylisocyanate).

Examples of other representative isocyanates which can be used in either the first or the second coating according to whether they are aliphatic or aromatic are described in U.S. 2,683,730, U.S. 2,292,442, and U.S. 2,929,794. Mixtures of any of the foregoing organic polyisocyanates can also be employed.

Examples of suitable ultraviolet light absorbent materials include among others those of the benzothiazole series such as: benzothiazole; 5-methyl benzothiazole; 5 - phenyl benzothiazole; 2,2' - dihydroxybenzophenone; 2,2',4,4' - tetrahydroxybenzophenone; 2,2' - dihydroxy - 4,4' - dimethoxybenzophenone; 2,2' - dihydroxy - 4,4' - diethoxybenzophenone; 2,2' - dihydroxy - 4,4' - dipropoxybenzophenone; 2,2' - dihydroxy - 4,4' - dibutoxybenzophenone; 2,2' -dihydroxy - 4 - methoxy - 4' - ethoxybenzophenone; 2 - hydroxy - 4,4' - diethoxybenzophenone; 2 - hydroxy - 4 - ethoxy - 4' - propoxybenzophenone; 2 - hydroxy - 4 - ethoxy - 4' - butoxybenzophenone; 2 - hydroxy - 4 - ethoxy - 4' - chlorobenzophenone; 2 - hydroxy - 4 - ethoxy - 4' - bromobenzophenone; and others such as dibenzoyl resorcinol; phenyl salicylate; resorcinol disalicylate; stilbene; β-methyl unbelliferone; 4-methylumbelliferone benzoate; dibutyl thiourea and the alkylated hydroxyphenyl benzothiazoles commercially available under the tradename "Tinuvin 327"; and others described in U.S. Patents 2,876,210; 2,976,259; 2,970,066; 2,990,306; 3,049,503; and 3,051,585.

When the ultraviolet light absorbent material is itself an active hydrogen containing material, cross-linking of the polyurethane is avoided by either adding less than cross-linking amounts of the material or by mixing the material with the polyurethane shortly before use. Alternatively, when employing two component polyurethane systems, the ultraviolet light absorbent material can be incorporated into the active hydrogen containing cross-linking material.

Mixing procedures are quite simple and require only adding the ultraviolet light absorbent material to the liquid polyurethane and stirring the resultant mixture. Stirring can be effected by any convenient means such as a motor driven impeller or a hand held spoon. The amount of light absorbent material will vary depending upon the final intended thickness of the second coating 12. In general, the second coating 12 will contain from about 0.01 to 20 weight percent and more preferably 1.5 to 6 weight percent of the ultraviolet light absorbent material. The above-described ultraviolet light absorbent materials can also be included in the first coating 11, although such is not essential in the present invention.

In preparing polyurethane polymers directly from the components, the proportions of reactants should be selected such that the value of the molar ratio of —NCO groups to the total number of —OH groups ranges between about 0.95:1 and 1.1:1. In the formation of isocyanate terminated prepolymers the polyisocyanate is employed in a molar excess of about 20 to 200 percent and preferably in a molar excess of about 50 to 100 percent. It will be recognized that as the isocyanate excess is increased, the resulting prepolymer will have a lower molecular weight.

When preparing the polyurethanes useful in the present invention, it is desirable to maintain the reagents as a homogeneous mixture from the time when they are mixed together until the time when they have completely reacted to form the cured polyurethane. Reaction temperatures involved in the direct formation of the polyurethanes are generally in the range of 0 to 200° C. Isocyanate terminated prepolymers are generally formed at temperatures of 10 to 120° C. and cured at ambient temperatures 15 to 25° C. It is to be understood, however, that both higher temperatures requiring shorter reaction times and lower temperatures requiring longer reaction times can also be employed.

The formation of the polyurethane can be conducted in the presence or absence or solvents. If solvents are employed they should be free of active hydrogen. Representative examples of suitable solvents are lower dialkyl ketones (such as methyl isobutyl ketone), lower alkyl esters (such as ethyl acetate), aromatic hydrocarbons (such as toluene and xylene), aliphatic hydrocarbons (such as hexane), chlorinated hydrocarbons (such as trichloro- and tetrachloroethylene), and cyclic ethers (such as tetrahydrofuran). The isocyanate terminated prepolymers or the cured polyurethanes can be isolated from the solvent by conventional means such as spray drying, drum drying, or evaporation. Those skilled in the art can readily select solid contents to suit their particular operation. Any of the above-described solvents and especially the volatile ones such as xylene or for example, can be employed to give a suitable viscosity to the polyurethane coating composition.

If desired, catalysts which accelerate the curing of the polyurethane can be employed. Such catalysts include triethylamine, metal carboxylates, e.g., lead naphthenate, diethylcyclohexylamine, or ferric acetylacetonate. Similarly, other additives heretofore employed in the formation of polyurethanes such as, for example, pigments such as titanium dioxide, plasticizers, acidic cross-linking inhibitors and ultraviolet light absorbent materials can be added.

While it is not desired to limit the invention to any theory, the following is offered by way of explanation. The preferred polyisocyanate prepolymer molecules apparently react with water according to Equation I:

(I)   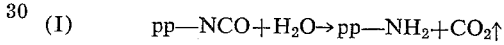

wherein the prepolymer containing a plurality of NCO groups is indicated by "pp—NCO." The NCO groups of the prepolymer react with water converting the NCO group into an amine ($NH_2$) and releasing carbon dioxide. In the preferred moisture curable one component polyurethane systems preferably employed in the present invention, this reaction is the principal reaction causing cross-linking as explained below. However, in the two component systems, some reaction of the NCO groups with water present in the air is unavoidable. Therefore, the above reaction occurs in both the one component and the two component polyurethane systems. The carbon dioxide produced can form bubbles which generally migrate towards the surface of the curing film and escapes into the air. By controlling the number of NCO groups on the prepolymer, it is possible to control the rate of evolution of carbon dioxide and in this manner avoid the formation of a bubble containing cellular coating. The prepolymer containing the amine groups then reacts with the same or another prepolymer molecule having an NCO group according to Equation II:

(II)   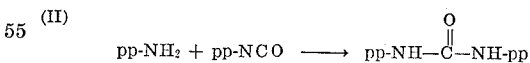

As is apparent, reaction II occurs between two prepolymer molecules. Because of steric considerations, every amine group formed by reaction I will not be able to cross-link by reaction with an NCO group. Thus, the final cured coating will contain a number of unreacted amine groups. The unreacted amine groups tend, in time, to undergo an undesirable color forming reaction. This color forming reaction is apparently catalyzed by ultraviolet light. While this latter reaction occurs to a certain extent in the case of amine groups attached to an aliphatic chain, the reaction is much more pronounced in the case of amine groups attached to an aromatic nucleus. Thus, in the present invention, the ultraviolet light absorbent material is concentrated in a coating of a polyurethane of a ultraviolet light resistant aliphatic polyisocyanate which protects the underlying less resistant aromatic polyisocyanate containing polyurethane from the ultraviolet radiation which catalyzes the color forming reaction.

As previously stated, the first and second coatings of the present invention can be applied to substrates such as those of wood, ceramic, ferrous metals, non-ferrous metals, and the like. When applied by such procedures as dipping, brushing, rolling, or spraying, these coatings can be used to protect the coated substrate from the adverse effects of weather, water, and air. Thus, such useful objects as boats, chairs, houses, walls, and floors can be advantageously coated according to the present invention.

The novel coated substrates of the present invention can be prepared by applying on the substrate the above described first coating comprising a curable polyurethane derived from an aromatic polyisocyanate, and then at least partially curing the polyurethane of said first coating in order to provide a base for the second coating, and then applying the above described second coating over the first coating.

The invention may be better understood by reference to the following examples, in which all parts and percentages are by weight unless otherwise indicated. These examples are illustrative of certain embodiments designed to teach those skilled in the art how to practice the invention and are not intended to limit the scope of the invention in any manner.

EXAMPLE 1

This example illustrates the synthesis of a polyurethane of an aromatic polyisocyanate which is useful in the present invention.

This polyurethane, termed Polyurethane A is prepared as described from the following quantities of the following materials.

| | Material | Quantity (grams) |
|---|---|---|
| Item: | | |
| A | NIAX PPG 1025 | 412 |
| B | 1,3-butylene glycol | 37 |
| C | Trimethylol propane | 66.6 |
| D | 2-ethoxyethanol acetate | 90.0 |
| E | Xylene | 1,185 |
| F | di-t-Butyl para cresol | 4.9 |
| G | Toluene diisocyanate | 404 |
| H | Dibutyl tin dilaurate | 0.15 |
| I | Triethylene diamine | 0.46 |
| J | Dibutyl thiourea | 22 |
| | | 2,222.11 |

Items A through F inclusive are charged to a round bottom flask fitted with a thermometer, a mechanical stirrer and a reflux condenser having a Dean-Stark water separation trap. The contents of the flask are heated at reflux until no more water distills off. The flask and its contents are then cooled to a temperature in the range of 120° to 130° F. and G is added. The flask and its contents are held at 120° to 130° F. for three hours whereupon H is added. The temperature of the flask and its contents is increased to a temperature within the range of 180° to 190° F. and held at this temperature until the contents of the flask exhibit a viscosity of C–D on the Gardner Holt scale. At this point the theoretical non-volatile content of the contents of the flask is 42%. The flask and its contents are then cooled to 110° F. and I and J are added.

The material, NIAX PPG 1025 is a polypropylene glycol having a mean molecular weight of 1000.

EXAMPLE 2

This example illustrates the synthesis of another aromatic polyurethane termed Polyurethane B which is useful in the present invention.

The procedure of Example 1 is repeated employing the same quantities, materials, times and conditions with the single exception that J is omitted.

EXAMPLE 3

This example illustrates the synthesis of polyurethane of an aliphatic polyisocyanate which is useful in the present invention.

This polyurethane termed Polyurethane C is prepared as described from the following quantities of the following materials.

| | Material | Quantity (grams) |
|---|---|---|
| Item: | | |
| A | TP 2540 | 50 |
| B | TP 440 | 117 |
| C | P2010 | 60 |
| D | P410 | 107 |
| E | Xylene | 171 |
| F | do | 200 |
| G | do | 300 |
| H | Dibutyl tin dilaurate | 0.17 |
| I | 4,4'-methylenebis(cyclohexylisocyanate) | 355 |
| | | 1,390.17 |

TP2540 is a polyoxypropylene derivative of trimethylol propane, and has a mean molecular weight of 2670. TP440 is a polyoxypropylene derivative of trimethylol propane and has a mean molecular weight of 418. P2010 is a polypropylene glycol having an average molecular weight of 2000, and P410 is a polypropylene glycol having an average molecular weight of 400.

Items A through E inclusive are charged to a round bottom flask fitted with a thermometer, a mechanical stirrer and a reflux condenser having a Dean Stark water separation trap. The contents of the flask are heated at reflux until no more water distills off. The flask and its contents are cooled to 110° F. and H is added. Items F and I are hand mixed in a separate vessel and heated to 215° F. to form a hot mixture of F and I. The flask and its contents are then heated to 215° F. and added to the mixture of F and I uniformly over a period of three hours. Heating of the flask and its contents are then continued until the contents exhibit a viscosity of 8 stokes. The flask and its contents are then cooled to room temperature (68° F.) and G is added, giving a theoretical non-volatile content of 50%.

EXAMPLE 4

This example illustrates the excellent resistance to color degradation of a coated substrate of the present invention.

Four panels, numbered 1, 2, 3, and 4, of a primed steel substrate are coated on one side with a 5 mil thick coating of a 50% nonvolatile, opaque white polyvinyl acetate paint and permitted to cure under ambient conditions for 48 hours. This white coating provides a light reflecting base for subsequent color tests on clear polyurethane coatings.

Polyurethane A is applied to all four of the above panels to produce a first wet coating 3 mils thick. The first coating is permitted to cure in air at 20° C., 50% relative humidity, for a period of 24 hours. At the end of this period, the thickness of the first coating is found to be 1.5 mils. The color of light reflected from panels #1 and #3 is measured by use of the Hunter Color Difference Meter and the results thereof are recorded in Table I.

Polyurethane C (200.0 g.) and the substituted hydroxyphenyl benzotriazole, commercially available as "Tinuvin 327" (2.38 g.) are mixed. This mixture is applied to panels #2 and #4 to produce a second wet coating 6 mils thick. The second coating is permitted to cure in air at 20° C., 50% relative humidity, for a period of 24 hours. At the end of this period, the thickness of the second coating is found to be 3 mils. Color tests are performed on panels #2 and # and the results thereof are recorded in Table I.

Panels #1 and #2 are then exposed to ultraviolet light from a carbon arc in the Atlas Weather-O-Meter, and panels #3 and #4 are exposed to sunlight. Color tests on these panels are also recorded in Table I.

TABLE I

| Hunter color meter scale [3] | Panels Exposed to Weather-O-Meter | | | | Panels Exposed to Sunlight | | | |
|---|---|---|---|---|---|---|---|---|
| | Before exposure | | After exposure [1] | | Before exposure | | After exposure [2] | |
| | Panel #1 | Panel #2 | Panel #1 | Panel #2 | Panel #3 | Panel #4 | Panel #3 | Panel #4 |
| Rd | 90.3 | 88.7 | 54.5 | 79.1 | 89.7 | 89.4 | 66.6 | 85.4 |
| a+ | 1.7 | 9.8 | 7.5 | 2.1 | 1.6 | 1.1 | 4.1 | 1.3 |
| b+ | 3.2 | 5.3 | 17.3 | 6.8 | 2.9 | 5.4 | 21.3 | 5.8 |

[1] 168 hours.
[2] 168 hours between 8:00 A.M. and 8:00 P.M. during the months of June and July 1966 at 45° N latitude, exposed in the horizontal position on a flat roof.
[3] Rd is a measure of the luminous reflectance, a+ is a measure of red on the red-green scale and b+ is a measure of yellow on the yellow blue scale. See U.S. 2,574,264.

EXAMPLE 5

This example illustrates the excellent resistance of a coated substrate of the present invention employing a different ultraviolet light absorbent material.

The procedures of Example 4 are repeated with the exceptions that "Tinuvin 327" is replaced by 2,2'-dihydroxy-4-methoxybenzophenone, on a gram for gram basis. The resultant panels exhibit resistance to ultraviolet light.

EXAMPLE 6

This example illustrates the excellent resistance of a coated substrate of the present invention employing as the first coating 11 a polyurethane having no ultraviolet light absorbent material.

The procedures of Example 4 are repeated with the single exception that Polyurethane A is replaced by Polyurethane B; on a gram for gram basis. The resultant panels exhibit resistance to ultraviolet light.

Although the invention has been described in considerable detail with reference to certain embodiments thereof, it will be understood that variations and modifications can be effected within the spirit and scope of the invention as described above and as defined in the appended claims.

What is claimed is:
1. A substrate coated with a first and a second coating, said first coating adhering to said substrate and said second coating adhering to said first coating,
   (A) said first coating comprising a polyurethane derived from aromatic polyisocyanate and an active hydrogen containing material,
   (B) said second coating comprising:
      (1) a polyurethane derived from an aliphatic polyisocyanate and an active hydrogen-containing material, and
      (2) an ultraviolet light absorbent material.
2. A coated substrate according to claim 1, wherein said second coating has a thickness of 0.5 to 50 mils and said ultraviolet light absorbent material is present in an amount equal to 0.01 to 20 weight percent based on the weight of said second coating.
3. A coated substrate according to claim 1, wherein said second coating has a thickness of 1.5 to 6 mils and said ultraviolet light absorbent materials is present in an amount equal to 1.5 to 6 weight percent based on the weight of said second coating.
4. A coated substrate according to claim 1, wherein said aromatic polyisocyanate is toluene diisocyanate.
5. A coated substrate according to claim 1, wherein said aliphatic polyisocyanate is 4,4'-methylene-bis(cyclohexylisocyanate).
6. A process for producing a substrate of claim 1, comprising in sequence the steps of:
   (A) applying on said substrate a first coating comprising a curable polyurethane derived from an aromatic polyisocyanate and an active hydrogen-containing material, and then
   (B) at least partially curing the polyurethane of said first coating, and then
   (C) applying a second coating over said first coating, said second coating comprising:
      (a) a curable polyurethane derived from an aliphatic polyisocyanate and an active hydrogen-containing material, and
      (b) an ultraviolet light absorbent material.
7. The process of claim 6, wherein the surface of said substrate has irregularities, and wherein said first coating is applied in such a thickness that the irregularities are covered, and wherein said first coating has a substantially planar upper surface.
8. The process of claim 6, wherein said second coating has a thickness of 0.5 to 50 mils and said ultraviolet light absorbent material is present in an amount equal to 0.01 to 20 weight percent based on the weight of said coating.
9. The process of claim 6, wherein said first and said second coatings are each applied in the form of a stable prepolymer which is curable by reaction with atmospheric water.
10. A coated substrate according to claim 1, wherein the active hydrogen-containing material from which one or both of said polyurethanes is derived is a hydroxyl-terminated polyester having an acid number of 20 to 200.
11. A coated substrate according to claim 1, wherein the active hydrogen-containing material from which one or both of said polyurethanes is derived is a hydroxyl-terminated polyether having a mean molecular weight of 300 to 10,000.

References Cited

UNITED STATES PATENTS 3,113,880  12/1963  Hoeschele et al. ____ 117—33.3
3,391,110  7/1968  Coleman.

MURRAY KATZ, Primary Examiner

R. M. SPEER, Assistant Examiner

U.S. Cl. X.R.

117—161

UNITED STATES PATENT OFFICE
CERTIFICATE OF CORRECTION

Patent No. 3,499,783            Dated March 10, 1970

Inventor(s)   Floyd M. Nelson, and Grant O. Sedgwick

It is certified that error appears in the above-identified patent and that said Letters Patent are hereby corrected as shown below:

Column 6, line 2, delete "or" solvents and add --of-- solvents. Column 8, line 18, delete " 300" and add --330--; line 72, add #--4--. Column 9, Table 1, beside a+ under Panel #2 delete "9.8" and add --0.8--.

Signed and sealed this 2nd day of November 1971.

(SEAL)
Attest:

EDWARD M. FLETCHER, JR.          ROBERT GOTTSCHALK
Attesting Officer                Acting Commissioner of Patents